(12) United States Patent
Stoner et al.

(10) Patent No.: US 11,038,299 B2
(45) Date of Patent: Jun. 15, 2021

(54) OPTIMIZED SHIPPING OF IP TELEPHONY DEVICES

(71) Applicant: VCE IP HOLDING COMPANY LLC, Richardson, TX (US)

(72) Inventors: Thaddeus Stoner, Richardson, TX (US); Joseph Layton, Richardson, TX (US)

(73) Assignee: VCE IP Holding Company LLC, Richardson, TX (US)

( * ) Notice: Subject to any disclaimer, the term of this patent is extended or adjusted under 35 U.S.C. 154(b) by 146 days.

(21) Appl. No.: 16/129,372

(22) Filed: Sep. 12, 2018

(65) Prior Publication Data

US 2019/0013613 A1 Jan. 10, 2019

Related U.S. Application Data

(62) Division of application No. 14/101,186, filed on Dec. 9, 2013, now Pat. No. 10,103,475.

(51) Int. Cl.

| H01R 13/46 | (2006.01) |
| H01R 43/26 | (2006.01) |
| H04M 19/00 | (2006.01) |
| H01R 31/06 | (2006.01) |
| H01R 24/64 | (2011.01) |
| H04Q 1/02 | (2006.01) |
| H01R 13/74 | (2006.01) |

(52) U.S. Cl.
CPC ............. *H01R 13/46* (2013.01); *H01R 24/64* (2013.01); *H01R 31/06* (2013.01); *H01R 43/26* (2013.01); *H04M 19/00* (2013.01); *H04Q 1/135* (2013.01); *H04Q 1/136* (2013.01); *H01R 13/741* (2013.01); *H01R 2201/16* (2013.01)

(58) Field of Classification Search
CPC ........ H01R 13/46; H01R 24/64; H01R 31/06; H01R 43/26; H01R 13/741; H01R 2201/16; H04M 19/00
USPC ........................................................ 206/320
See application file for complete search history.

(56) References Cited

U.S. PATENT DOCUMENTS

| 4,403,106 A | 9/1983 | Lask et al. |
| 5,639,262 A | 6/1997 | Lim |

(Continued)

*Primary Examiner* — J. Gregory Pickett
*Assistant Examiner* — Jenine Pagan
(74) *Attorney, Agent, or Firm* — Womble Bond Dickinson (US) LLP

(57) ABSTRACT

A connector and cabling system is provided. The system includes a plurality of pigtails, each pigtail of the plurality of pigtails are configured to couple to one of a plurality of electronic devices, wherein each electronic device of the plurality of electronic devices has a corresponding box or package. The system includes a cable and a plurality of first connectors. Each first connector of the plurality of first connectors is configured to extend through and attach to a wall of a box or opening of the package with a first port of the first connector inside the box. The first port is coupled to the pigtail, and a second port of the first connector outside the box or package. The second port is coupled to the cable. The plurality of electronic devices is provisioned via the cable, the plurality of first connectors and the plurality of pigtails, with each of the plurality of electronic devices, in the corresponding box or package. A method of preparing electronic devices for shipping is also provided.

5 Claims, 3 Drawing Sheets

(56) References Cited

U.S. PATENT DOCUMENTS

| | | | |
|---|---|---|---|
| 5,927,050 A * | 7/1999 | Houck | G06F 1/16 |
| | | | 53/412 |
| 6,330,168 B1 | 12/2001 | Pedoeem et al. | |
| 7,122,738 B2 | 10/2006 | Kanamaru | |
| 7,308,500 B1 * | 12/2007 | Miyamoto | G06F 1/18 |
| | | | 709/226 |
| 8,245,326 B1 | 8/2012 | Tolve | |
| 9,089,059 B1 * | 7/2015 | Haskin | G06F 1/1626 |
| 2002/0114439 A1 * | 8/2002 | Dunlap | H04M 7/0057 |
| | | | 379/219 |
| 2004/0196997 A1 | 10/2004 | Boonen | |
| 2005/0164536 A1 | 7/2005 | Titchener | |
| 2005/0286900 A1 | 12/2005 | Bentley et al. | |
| 2006/0289444 A1 | 12/2006 | Jackson et al. | |
| 2010/0171465 A1 | 7/2010 | Seal et al. | |
| 2010/0218465 A1 | 9/2010 | Takaya | |
| 2011/0274403 A1 | 11/2011 | Leblanc et al. | |
| 2013/0286896 A1 | 10/2013 | Selph et al. | |
| 2014/0345129 A1 | 11/2014 | Fransen et al. | |

\* cited by examiner

# OPTIMIZED SHIPPING OF IP TELEPHONY DEVICES

CROSS-REFERENCE TO RELATED APPLICATIONS

The present application is a divisional of U.S. patent application Ser. No. 14/101,186, filed on Dec. 9, 2013, entitled Optimized Shipping of IP Telephony Devices, the contents of which are incorporated herein by reference in their entirety.

BACKGROUND

Provisioning of IP (Internet Protocol) telephony devices, e.g., desktop telephones for an enterprise, is time-consuming and resource intensive. The same applies to other types of configurable electronics. The present approach, utilized to provision IP telephony devices, is to deploy the phones in a generic, unconfigured, untested condition to the desktops or cubicles of the users of the phones. Once at these locations, a physical inventory is performed, matching a physical identifier (e.g., a barcode, a serial number, or other identification plate or sticker) on the phone to the new end-user. Each phone is then configured by on-site personnel, at the new location. Another approach is to un-package each IP telephony device, install the IP telephony device in a workbench type of environment, initiate a configuration, test the configuration against the IP telephony device, repackage the IP telephony device, ship the IP telephony device to its destination, then match the IP telephony device to the deployed location.

SUMMARY

In some embodiments, a connector and cabling system is provided. The system includes a plurality of pigtails, each pigtail of the plurality of pigtails are configured to couple to one of a plurality of electronic devices, wherein each electronic device of the plurality of electronic devices has a corresponding box or other suitable packaging. The system includes a cable and a plurality of first connectors. Each first connector of the plurality of first connectors is configured to extend through and attach to a wall of a box or opening in the packaging with a first port of the first connector inside the box or other suitable packaging. The first port is coupled to the pigtail, and a second port of the first connector outside the box or other suitable packaging. The second port is coupled to the cable. The plurality of electronic devices is provisioned via the cable, the plurality of first connectors and the plurality of pigtails, with each of the plurality of electronic devices, in the corresponding box or other suitable packaging. A method of preparing electronic devices for shipping is also provided.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A shipping assembly for boxed or otherwise packaged electronic devices, a connector and cabling system used in the shipping assembly, and a related method for preparing electronic devices for shipping, are herein presented. Although illustrated with IP (Internet Protocol) telephony devices, e.g., telephones that communicate over a network using Internet Protocol, aspects of the present disclosure can be applied to other types of electronic devices.

IP telephony devices, or other electronic devices, each in a box or other packaging, are prepared for shipping. To prepare the electronic devices for shipping, a pigtail, which may be referred to as a cable to which connectors are provided on each end, is attached to each electronic device. The pigtail resides inside the box containing the electronic device, and is attached to a cable. The cable resides outside of the boxes containing the electronic devices. A pallet holding the boxed electronic devices, with pigtails and the cable, is shipped to a destination. Each electronic device may be provisioned while inside the corresponding box or packaging under this configuration. It should be appreciated that provisioning can occur before or after shipping. Thus, the embodiments provide for the efficient provisioning and testing at a customer's final usage location. The connection of multiple electronic devices on a common pallet that may be re-useable enables configuration, testing, provisioning, etc., while the electronic devices are resident in the shipping packaging. Thus, when the electronic devices arrive at the final destination, the devices can be connected and be ready for use. It should be appreciated that other suitable packaging besides a box may be utilized with the embodiments described herein. For example, the electronic devices may be wrapped in cellophane, stretch wrap film, shipping tape, placed in formed polystyrene or other types of foam. The electronic devices may be shipped utilizing bubble wrap, popcorn, form-cut paper, cardboard, corrugated packaging, polystyrene formed/pellets, plastic formed, shrink wrapped, wooden pallets/enclosures and other various shipping configurations that may or may not include a box having a wall, as well as any other packaging material well known to those of skill in the art. Accordingly, the embodiments are not limited to a boxed configuration as alternative stacked or palletized configurations without boxes for each electronic device may be utilized. Where a box configuration is not used, the embodiments may connect or couple the cables described herein through an opening in the packaging in some embodiments. In addition, the cables may be directly coupled without the necessity of coupling through a connector disposed in a wall in some embodiments where the electronic devices are not boxed.

Figure 1:
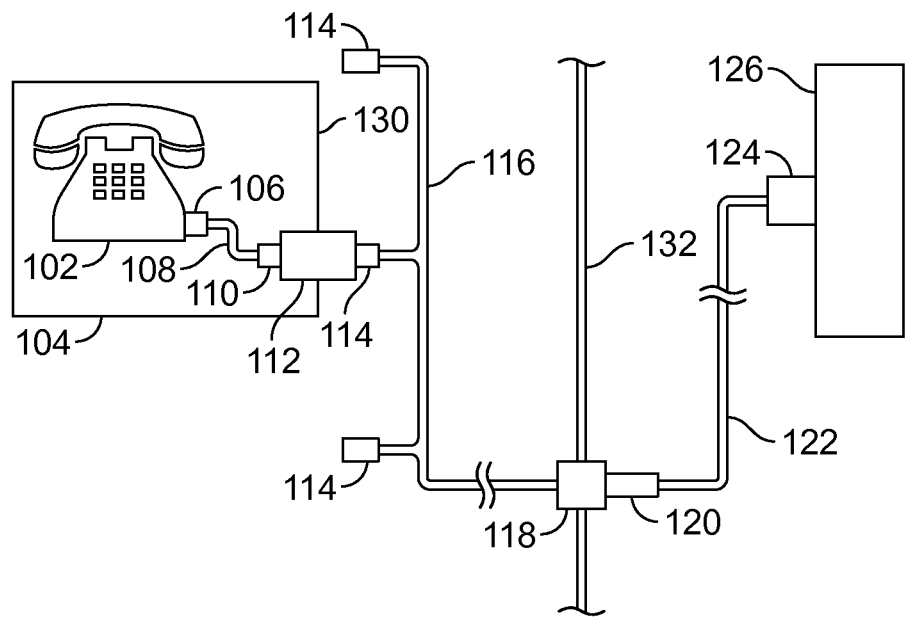
FIG. 1 is a schematic of a shipping assembly for packaged electronic devices, with a connector and cabling system, in accordance with some embodiments.

FIG. 1 is a schematic of a shipping assembly for boxed electronic devices 102, with a connector and cabling system in accordance with an embodiment of the present disclosure. In the example shown, the electronic device 102 is an IP telephony device. Each electronic device 102 has a corresponding box 104, which could include the packaging that surrounds and protects the electronic device 102 prior to deployment of the electronic device 102. Although only one electronic device 102 and one box 104 is shown, it is readily appreciated that multiple electronic devices 102, each in a corresponding box 104, are accommodated.

A pigtail 108 is attached to the electronic device 102. In the example shown, the pigtail 108 has two connectors 106, 110, which could be called the first connector 106 of the pigtail 108, and the second connector 110 of the pigtail 108 in some embodiments. The connector 110 could be at an opposed end of the pigtail 108 from the connector 106. The first connector 106 of the pigtail 108 is coupled to the electronic device 102, such as by plugging the connector 106 into a port of the electronic device 102. For example, the IP telephony device could include an Ethernet port, and the connector 106 would then include an Ethernet connector. The Ethernet port of the IP telephony device could include a female connector, and the first connector 106 of the pigtail 108 would then include a male connector. For example, RJ-45 connectors could be used for LAN (local area network) connections in some embodiments. Other types and positions of connectors and other types of pigtails are readily devised as noted below as the embodiments may be extended to any Internet connectable appliance or device that must be provisioned prior to installation, such as set top boxes, cell phones, switches, wireless access points, tablets, TVs, laptops, servers, blades, and other electronics that can be powered on within their shipping containers and connected to a data network. It should be appreciated that genders of connectors and ports could be swapped, and connectors, cables and ports conforming to various standards can be employed in the embodiments as the examples provided herein are not meant to be limiting. It should be further appreciated that a pigtail as used herein is a cable suitable for communicating with electronic device 102 that extends between connectors 106 and 110 in some embodiments.

In one embodiment, as shown in FIG. 1, a connector 112 extends through a wall 130 of the box 104. For example, a portion of the connector 112 could extend inward to the interior of the box 104, and a further portion of the connector 112 could extend outward to the exterior of the box 104. In variations, the connector 112 could have a surface flush with either an outer surface or an inner surface of the box 104. The connector 112 has two ports, the first of which is inside of the box 104, the second other of which is outside of the box 104. In the example shown, the connector 112 has two female ports; however this is one example as alternative configurations are readily devised. Various aspects of embodiments of the connector 112 will be further discussed regarding FIGS. 2-5.

Continuing with FIG. 1, the pigtail 108 couples to the connector 112. As illustrated, one connector 106 of the pigtail 108 is coupled to the electronic device 102, and the other connector 110 of the pigtail 108 couples to the connector 112. In this example, the connector 110 includes a male connector, which plugs into the first female port of the connector 112, inside of the box 104. A cable 116 resides outside of the box 104, and has multiple connectors 114. One of the connectors 114 couples to the connector 112. In this example, the connector 114 includes a male connector, which plugs into the second female port of the connector 112, outside of the box 104. Further connectors 114 of the cable 116 couple to further connectors 112 of further boxed electronic devices 102 (not shown in FIG. 1, but readily appreciated). For example, the electronic devices may be stacked within or on a pallet in some embodiments. In some embodiments, the cable 116 snakes around to all of the boxed electronic devices 102 of a stacked configuration. Cable 116 may have branches to the various electronic devices 102, for example branches which service rows, columns, layers or stacks of the electronic devices 102. Thus, the cable 116 is coupled to the pigtails 108, which couples to the electronic devices 102, i.e., the cable 116 is coupled to the electronic devices 102 via the pigtails 108.

The cable 116 can be coupled to a provisioning device 126. In the embodiment shown in FIG. 1, the cable 116 includes a connector 118. In a further embodiment, the cable 116 can be coupled to the connector 118, such as by a connector of the cable 116. A further cable 122, with connectors 120, 124, couples the provisioning device 126 to the cable 116. For example the connector 120 of the cable 122 could couple to the connector 118, and the other connector 124 of the cable 122 could couple to the provisioning device 126. The provisioning device 126 is thereby coupled to the electronic devices 102 via the cables 122, 116, the connectors 118, 112, and the pigtails 108. In one embodiment, the provisioning device 126 includes an Ethernet switch. In some embodiments, the provisioning device 126 is a provisioning server, terminal server, multiplexors, digital access cross-connect device, firmware device, etc. Connectors 120 and 124 may be a multi pin connector available from Amphenol Corporation in some embodiments.

In the embodiment shown in FIG. 1, the connector 118 couples the cable 116, which is inside or on a pallet 132, to the cable 122, which is outside or off of the pallet 132. For example, the connector 118 could be positioned partway through a wall of the pallet 132 or at an edge of the pallet 132. Although the connectors, cables, the electronic device 102 and the provisioning device 126, are shown coupled together in FIG. 1, it is readily appreciated that the connectors allow decoupling, and that like connectors 114 can be exchanged with one another in a coupling arrangement. It is further appreciated that the connectors can be coupled in various sequences prior to provisioning, and decoupled in various sequences following provisioning. In further embodiments, fewer or a greater number of connectors, couplings, cables, pigtails, ports and so on could be used.

Figure 2:
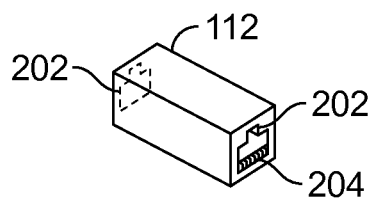
FIG. 2 is a perspective view of a connector suitable for use in the connector and cabling system, or the shipping assembly, of FIG. 1 in accordance with some embodiments.

FIG. 2 is a perspective view of a connector 112 suitable for use in the connector and cabling system, or the shipping assembly, of FIG. 1. In this example, the connector 112 has two female ports 202, at opposed ends of the connector 112. Electrical contacts 204 provide electrical connection to the connector 112, such as by a male connector dimensioned to fit the female port 202. In some embodiments connector 112 may have a flat extension or wing extending peripherally from a middle section of the connector. This flat extension may support the connector in the wall of the box, e.g., by being sandwiched between corrugated pieces of the wall of the box of the electronic device.

Figure 3:
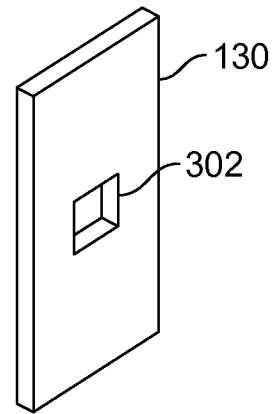
FIG. 3 is a perspective view of an aperture through a wall of a box of one of the packaged electronic devices of FIG. 1 in accordance with some embodiments.

FIG. 3 is a perspective view of an aperture 302 through a wall 130 of a box 104 of one of the boxed electronic devices 102 of FIG. 1. The aperture 302 could be produced by a tool, such as a punch or a cutting tool. In one embodiment, the aperture 302 is produced by pushing the connector 112 through the wall 130, with the connector 112 having sharpened edges or sharpened protrusions. In various embodiments, the connector 112 is inserted partially through the aperture 302 in the wall 130. The connector 112 could be attached to the wall by an adhesive, friction, fasteners, tape, prongs, wings, threads or other devices or techniques readily devised in accordance with the teachings herein. It should be appreciated that aperture 302 may be any opening within a package containing the electronic devices 102 and is not limited to an aperture within a wall of a box.

Figure 4:
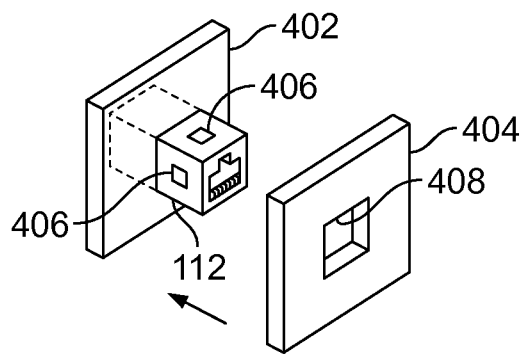
FIG. 4 is a perspective view of the connector of FIG. 2, with added skirts for clamping the wall of the box of FIG. 3 in accordance with some embodiments.

FIG. 4 is a perspective view of the connector 112 of FIG. 2, with added skirts 402, 404 for clamping the wall 130 of the box of FIG. 3. In one embodiment, a first skirt 402 is attached to the connector 112. A portion of the connector 112 protrudes perpendicularly from one face of the first skirt 402, and a further portion (shown in dashed lines) of the connector 112 protrudes perpendicularly from an opposed second face of the first skirt 402. A second skirt 404 has an aperture 408, which is dimensioned to fit the profile of the connector 112. Assembly of the second skirt 404 to the connector 112 is performed after passing a portion of the connector 112 through the aperture 302 of the wall 130 of the box 104. The second skirt is assembled to the connector 112, with a portion of the connector 112 passing through the aperture 408 of the second skirt 404. Prongs 406, attached to the connector 112, fold as the second skirt 404 and the walls of the aperture 408 compress the prongs 406. The prongs 406 then spring back up to secure the second skirt 404, once the second skirt 404 has passed closer to the first skirt 402 than the location at which the prongs 406 are attached to the connector 112. Other mechanisms for retaining a second skirt 404 to the connector 112 are readily devised. In a further embodiment, the connector 112 is used with the first skirt 402 and the prongs 406 to secure through the wall 130, without use of a second skirt 404. In a still further embodiment, the connector 112 includes a two-piece connector, with each piece having a retention surface, and the two pieces snapping together to clamp the wall 130 of the box 104.

Figure 5:
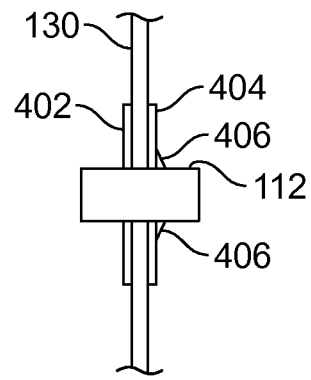
FIG. 5 is a cross-section view of the connector and skirts of FIG. 4 assembled to the wall of the box of FIG. 3 in accordance with some embodiments.

FIG. 5 is a cross-section view of the connector 112 and skirts 402, 404 of FIG. 4 assembled to the wall 130 of the box of FIG. 3. The skirts 402, 404 are positioned on opposed sides of the wall 130. Prongs 406 hold the second skirt 404 pressed against a surface of the wall 130, while the first skirt 402 presses against on opposed surface of the wall 130. In variations, the connector 112 could be inserted from the outside of the box 104, or from the inside of the box 104 (e.g., with a lid of the box removed).

Figure 6:
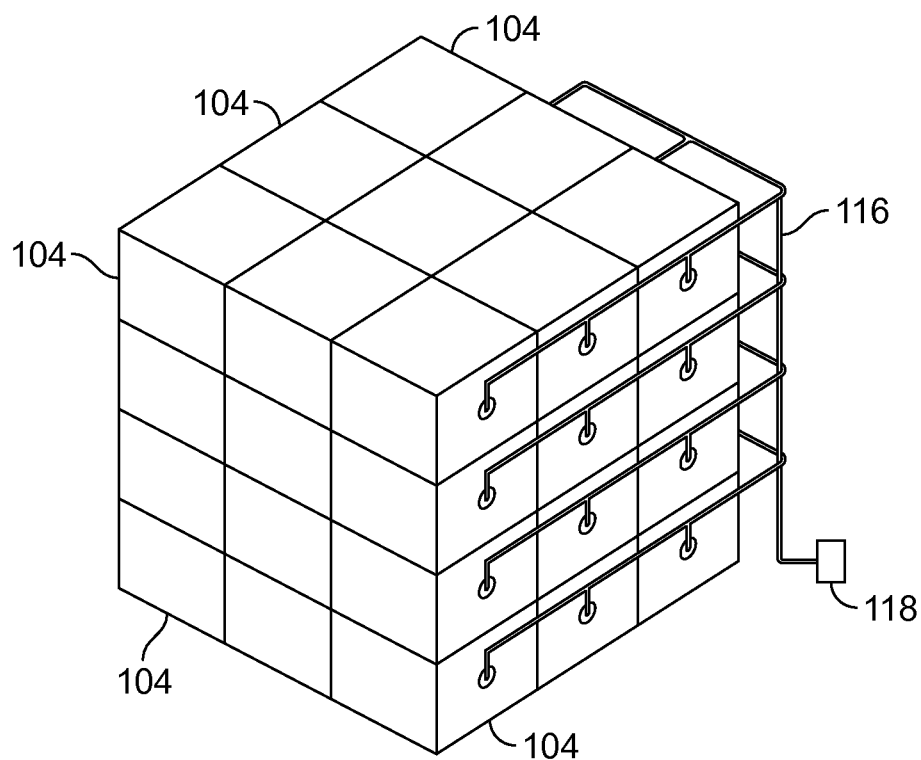
FIG. 6 is a perspective view of a group of packaged electronic devices, arranged with the connector and cabling system of FIG. 1 in accordance with some embodiments.

FIG. 6 is a perspective view of a group or pallet of boxed electronic devices, arranged with the connector and cabling system of FIG. 1. Here, the boxes 104 are shown stacked up and packed together, with the cable 116 routed to each of the boxes as described above. The electronic devices 102 are inside of the boxes 104, with pigtails. The electronic devices 102 can be provisioned via the cable 116. In this example, the cable 116 is shown with branches to the layers and rows of boxes 104. Other branching configurations, such as to columns or other portions of the boxes 104, or arrangements or routings such as snaking or zigzagging of the cable 116, are readily devised. Cabling 116 is coupled to connector 118, which may be affixed to a pallet wall, coupled to a pallet surface, coupled to an outer surface of a box of the stack, etc.

Figure 7:
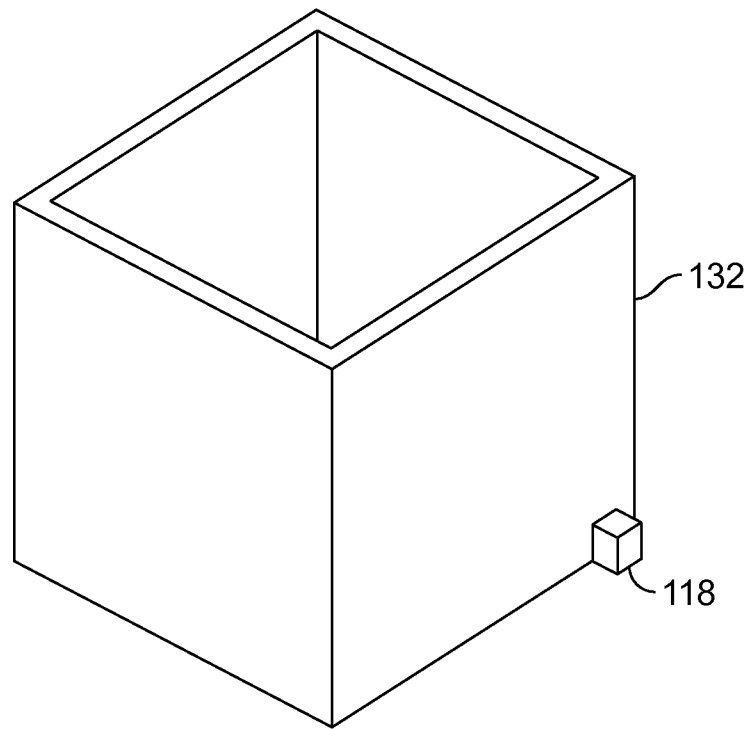
FIG. 7 is a perspective view of a pallet suitable for use with the connector and cabling system, in the shipping assembly of FIG. 1 in accordance with some embodiments.

FIG. 7 is a perspective view of a pallet 132 suitable for use with the connector and cabling system, in the shipping assembly of FIG. 1 in accordance with one embodiment. Pallet 132 could be flat platforms or reusable containers in some embodiments. In this example, the pallet 132 is in the form of an open container, and has the connector 118 embedded in a wall of the pallet 132. Other arrangements for the connector 118 or the cable 116, and other mechanisms for attaching the cable 116 or the connector 118 to the pallet 132 are readily devised in accordance with the teachings disclosed herein. It should be appreciated that the boxed electronic devices 102 can be coupled to the cable 116 and placed in the pallet 132 one at a time, or in groups of two or more, in preparation for shipping. It should further be appreciated that the boxed electronic devices could be coupled to the cable 116 and then placed, in a group, in the pallet 132. The boxed electronic devices can be spaced apart in some embodiments in order for the cabling to access the inner boxes of the stack. Provisioning can occur at any time after the electronic devices have been coupled to the cable 116. In some embodiments, an Ethernet switch or other suitable provisioning device is attached to the pallet 132. It should be appreciated the use of pallet 132 is optional as the stacked configuration of electronic devices may be shrink wrapped in some embodiments with connector 118 coupled to a box of the stack. It should be further appreciated that a stacked configuration of boxes may include multiple connectors 118 in some embodiments.

Power can be provided to the electronic devices 102 through various mechanisms. USB (Universal serial bus) devices can have electric power provided through USB-compatible cables and connectors, in which case the cable 116, pigtails 108, and various connectors would conform to a USB standard. Ethernet-connectable devices, including IP telephony devices, could have electric power provided through power over Ethernet (POE), in which case the cable 116, pigtails 108, and various connectors would conform to a POE standard. A mobile communication device may have a single port for both communication and power to recharge batteries, in which case the cable 116, pigtails 108, and various connectors would conform to an applicable standard. Alternatively, a mobile communication device may have separate ports for communication and power to recharge batteries, in which case a connector 112 could include both types of connections, and the cable 116, pigtails 108 and various connectors would conform to both applicable standards. Further types of electronic devices 102 could have power and communication applied via a cable 116, one or more pigtails 108 or a branched pigtail, and various connectors that conform to an applicable standard.

In order to individually provision each electronic device 102, a provisioning device 126 should establish individual communication with each electronic device via the cable 116. One mechanism supporting this is available when each electronic device has a unique electronic identifier. For example, Ethernet-connectable devices each have a media access control (MAC) address unique to the individual device, provided by the manufacturer. Thus, a provisioning device 126 coupled to multiple electronic devices 102 via the cable 116 and pigtails 108 can communicate individually with each electronic device 102, using the MAC address of the electronic device 102. A communication manager could build a database of every endpoint and the associated MAC address in some embodiments. In some embodiments, USB devices may self-identify themselves. Mobile communication devices may have a unique serial number, or a SIM (subscriber identity module) card with unique identification. Set-top boxes, for televisions, may also have unique identification.

Figure 8:
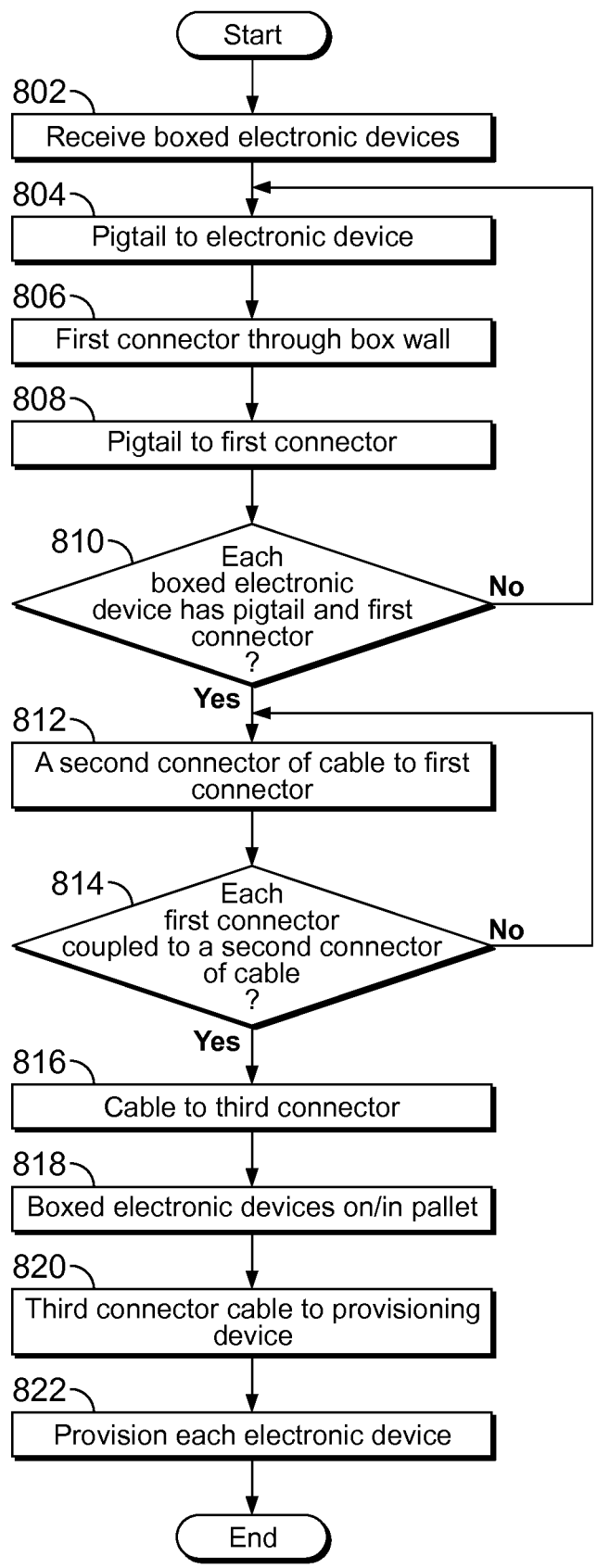
FIG. 8 is a flow diagram of a method for preparing electronic devices for shipping, which can be practiced using the shipping assembly with the connector and cabling system, in accordance with some embodiments.

FIG. 8 is a flow diagram of a method for preparing electronic devices for shipping, which can be practiced using the shipping assembly with the connector and cabling system, of FIG. 1. Boxed electronic devices are received, in an action 802. For example, a bulk shipment of electronic devices could be received, and the boxes are then separated into groups and re-bundled for distribution to customers. Each customer could request provisioning prior to shipment of a respective group or bundle of boxed electronic devices, or could perform provisioning after receiving a shipment. A pigtail is connected to each electronic device, in an action 804. For example, the box of each boxed electronic device could be opened, and a pigtail or connector is inserted into the box and connected to the electronic device therein. As mentioned above, alternative packaging configurations to a box may be utilized with the embodiments described herein. For example, the electronic devices may be wrapped in shrink wrap, placed into foam separators that may or may not enclose each electronic device, etc.

A first connector is arranged or provided through a box wall or an opening in an alternative packaging configuration, in an action 806. For example, the first connector is pushed through an aperture in the wall of the box, for each boxed electronic device. In other embodiments, the first connector may be integrated into the wall of the box or opening of the packaging, during assembly of the box or alternative packaging configuration. The first connector could be secured to the wall of the box using various mechanisms as described above. This could be performed while the electronic device is outside of the box, or with the electronic device in the box, in variations. An arrangement could be made with the provider of the boxed electronic devices, to insert the pigtails and first connectors prior to the bulk shipment of electronic devices in some embodiments The pigtail is coupled to the first connector, in an action 808. For example, the pigtail could be coupled to the first connector, inside of the box. The three actions 804, 806, 808 could be performed in various orders, i.e., the pigtail could be connected first to either the electronic device or the first connector, and the first connector could be placed through the box wall before or after the pigtail connections are started or completed, or after a first pigtail connection is made and a second pigtail connection is yet to be completed.

In a decision action 810, the question is asked, is it the case that each boxed or packaged electronic device has a pigtail and a first connector? If the answer is no, some of the boxed electronic devices do not yet have pigtails and first connectors, the flow branches back to the action 804 so that the next pigtail can get connected to the next electronic device, the next first connector can be routed through a box wall, and the pigtail can get connected to the first connector. If the answer is yes, all of the boxed electronic devices have pigtails and first connectors, flow proceeds to the action 812.

A second connector of the cable is coupled to the first connector, in an action 812. For example, a second connector of the cable could be coupled to the first connector, outside of one of the boxes. In a decision action 814, the question is asked, is it the case that each first connector is coupled to a second connector of the cable? If the answer is no, some of the first connectors are not yet coupled to a second connectors of the cable, the flow branches back to the action 812 so that the remaining first connectors can get connected to the cable. If the answer is yes, all of the first connectors are coupled to second connectors of the cable, then the flow branches to the action 816.

The cable is coupled to the third connector, in an action 816. For example, the cable could be coupled to a connector that passes through a portion of a pallet, is positioned along an edge of a pallet, or the connector may be affixed to an outside of one of the boxes of the stack or pallet. As a further example, the third connector could be integrated with the cable. The boxed electronic devices are placed on or in the pallet, in an action 818. For example, each electronic device could be placed in a pallet before or as the device is coupled to the cable via the first connector and the pigtail. As a further example, the electronic devices could be coupled to the cable and then placed in or on the pallet.

The third connector is coupled to the provisioning device, i.e., the cable is coupled to the provisioning device, in an action 820. For example, a second cable could be coupled to the third connector and coupled to the provisioning device. The second cable would thus couple the third connector and the first cable to the provisioning device. Each electronic device is provisioned, in an action 822. This could be accomplished using the power and communication mechanisms described above, before or after shipping. Provisioning of the boxed electronic devices would thus occur via the provisioning device, the second cable, the third connector, the first cable, the second connectors, the first connectors, and the pigtails. In the case of IP telephony devices, provisioning could include configuring the device with a direct dial number or an extension, or setting up various options or permissions. Other electronic devices would be provisioned in accordance with capabilities and options of the device. It should be appreciated that provisioning the electronic devices may relate to a service of which the electronic device makes use. For example, the provisioning of the electronic devices may refer to the process of preparing and equipping the electronic devices to be recognized by a network to allow the electronic device to provide a service to a user. In some embodiments, the provisioning process monitors access rights and privileges to ensure the security of an enterprise's resources and user privacy. In other embodiments the provisioning process ensures compliance and minimizes the vulnerability of systems to penetration and abuse.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the various operations at various intervals associated with the method.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A shipping assembly for boxed electronic devices, comprising:
    a plurality of electronic devices in a stacked configuration, each of the plurality of electronic devices disposed inside a corresponding package;
    a plurality of female-to-female connectors, each female-to-female connector of the plurality of female-to-female male connectors configured to extend through and attach to an opening of the corresponding package for one of the plurality of electronic devices, each female-to-female connector with a first port and a second port that are respectively inside the corresponding package and outside the corresponding package when extended through and attached to the opening of the corresponding package;
    a plurality of pigtails, each pigtail of the plurality of pigtails including a first male connector and a second male connector coupleable to respectively a port of one of the plurality of electronic devices and the first port of one of the plurality of female-to-female connectors; and
    a cable having a plurality of male connectors, each male connector of the plurality of male connectors coupleable to the second port of one of the plurality of female-to-female connectors, with the male connector and the cable outside of the package, the cable including a further connector directly or indirectly coupleable to a provisioning device to enable the provisioning device to provision the plurality of electronic devices via the cable, the plurality of female-to-female connectors, and the plurality of pigtails.

2. The shipping assembly of claim 1, wherein the package includes one or more of a box, formed polystyrene, stretch wrap film, shipping tape, bubble wrap, popcorn, form-cut paper, cardboard, corrugated packaging, polystyrene formed/pellets, plastic formed, shrink wrap, or wooden pallets/enclosures.

3. The shipping assembly of claim 1, wherein:
    the provisioning device includes an Ethernet switch, and
    the further connector of the cable is coupleable to the Ethernet switch.

4. The shipping assembly of claim 1, wherein each female-to-female connector of the plurality of female-to-female connectors has opposed portions configured to sandwich a wall of the package from opposed sides of the wall.

5. The shipping assembly of claim 1, wherein the plurality of electronic devices is stacked within a pallet and wherein the pallet and the cable are reusable.

* * * * *